T. V. CLAPP.
RAT TRAP.
APPLICATION FILED SEPT. 16, 1920.

1,371,070.

Patented Mar. 8, 1921.

WITNESSES
Frederick Diehl.
Franklin J. Foster

INVENTOR
T. V. CLAPP
BY
ATTORNEYS

UNITED STATES PATENT OFFICE.

THEODORE VANDERBILT CLAPP, OF SPRINGFIELD, MASSACHUSETTS.

RAT-TRAP.

1,371,070.   Specification of Letters Patent.   Patented Mar. 8, 1921.

Application filed September 16, 1920. Serial No. 410,760.

*To all whom it may concern:*

Be it known that I, THEODORE V. CLAPP, a citizen of the United States, a resident of the city of Springfield, county of Hampden, and State of Massachusetts, have invented a new and Improved Rat-Trap, of which the following is a full, clear, and exact description.

This invention relates to improvements in rat traps, particularly to that form of rat traps, which provide ready entrance to the trap, which are so constructed that egress from the trap is made impossible, and it is particularly designed as an improvement over the Letters Patent of the United States #1,234,629, issued to me on July 24th, 1917.

An object of the invention is to provide an improved door construction, which will aid in facilitating the entrance of an animal into the trap and in effectively preventing his escape.

A still further object is to provide a trap of this type, which will be strong and durable in use, practical in construction and inexpensive to manufacture.

With these and other objects in view, the invention consists in certain novel features of construction, and combinations and arrangements of parts, as will be more fully hereinafter described and pointed out in the claims.

Figure 1:
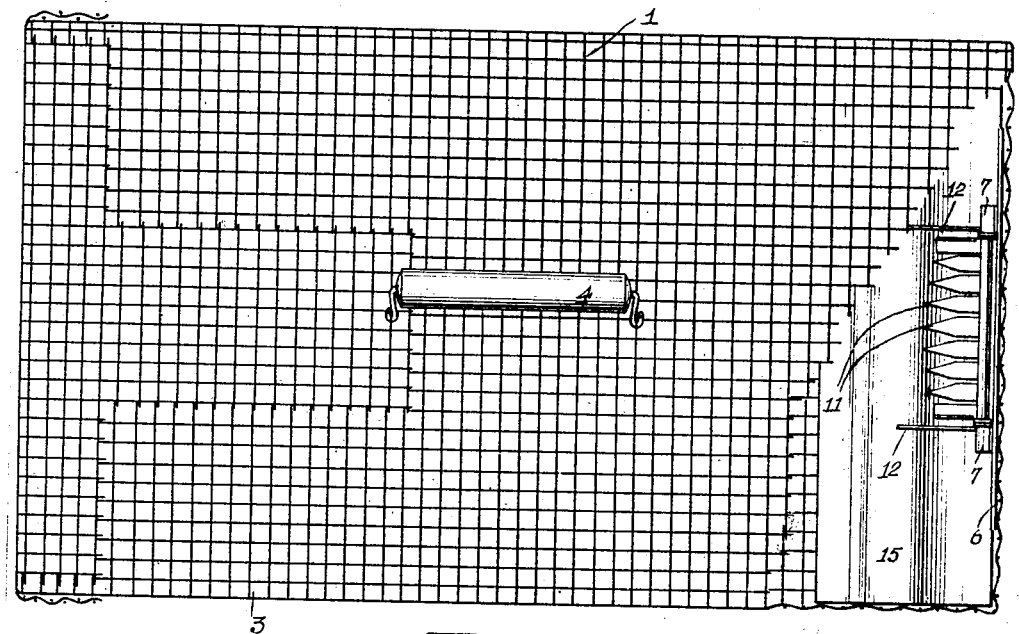
Figure 1 is a top plan view of my improved trap, with parts broken away for clearness.
Figure 2:
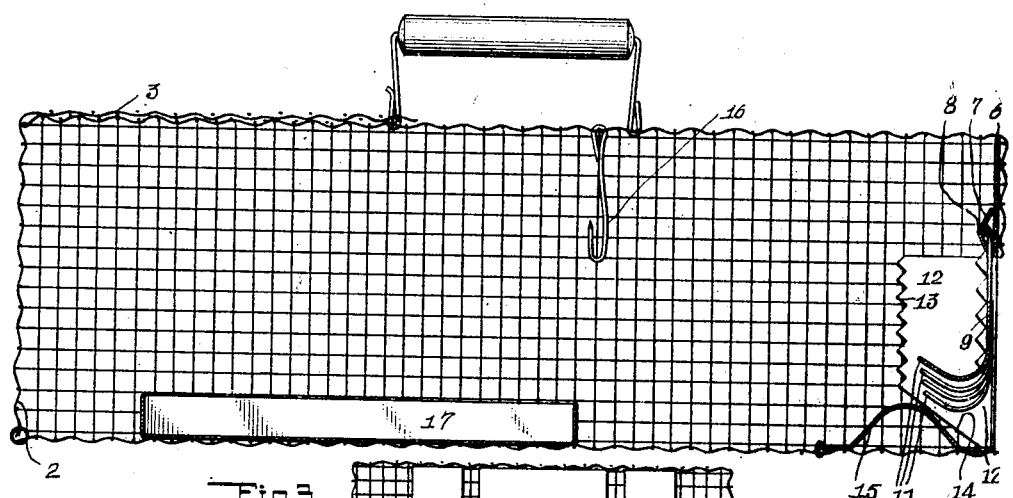
Fig. 2 is a view in longitudinal section therethrough.
Figure 3:
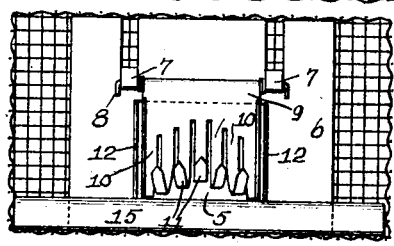
Fig. 3 is a view in elevation of the door construction.

Referring in detail to the drawings, the trap comprises a rectangular casing 1, preferably of wire mesh. One end wall 2 of the casing forms a door, which is hinged at its lower edge and provided with an extension 3, overlapping the top of the casing. A handle 4, is secured to the top of the casing and one end of the handle 4 is removably secured to the extension 3, so that the handle serves to keep the door 2 in locked position.

The casing is provided with an opening 5, at its other end and a metal door frame 6, is located around the opening, and within the casing. The frame 6 is made integral with a pair of bearing brackets 7. A shaft 8, is mounted in the brackets and a swinging metal door 9, depends from the shaft 8. The door 9 is of tin or some similar bendable metal and the lower portion of the door is slitted or serrated to form fingers 10. The fingers 10 are curved inwardly and upwardly and pointed to form barbs 11, projecting into the casing.

The door frame 6 is also provided with a pair of inwardly projecting wing portions 12, which are located at each side of the door, and the inner edges of the wing portions are toothed or barbed, as shown at 13. The lower portions of the wings 12, are beveled, as shown at 14, to accommodate a bowed floor plate 15, located transversely across the end of the casing. The door frame 6 serves to prevent the outward swinging movement of the door 9.

Any suitable devices such as hook 16, or a pan 17, are employed to hold bait. The central fingers 10, are bent upwardly more than the rest of the fingers, so that a small opening is left between the door and floor plate to induce the rat to enter.

It will be noticed that a rat may have ready ingress to the trap, as he only engages the smooth faces of the fingers 10 and the floor plate 15 on entering, raising the door 9 with his body. This door automatically closes after the rat has entered the trap. The pointed or barbed fingers 10, together with the serrated wing portions 12, prevent the rat from leaving the trap. An attempt to leave the trap only results in impaling himself on the barbs.

The trapper may dip the trap in water after the rat has been caught, or any approved means may be employed to kill him before disposing of him through the door 2.

While I have illustrated one of the preferred embodiments of my invention, it is apparent that various slight changes and modifications might be made in the general form of the parts described without departing from my invention, and hence I do not limit myself to the precise details set forth, but shall consider myself at liberty to make such slight changes and modifications as fairly fall within the scope of the appended claims.

I claim:

1. A rat trap comprising a rectangular casing, having an opening at one end thereof, a door frame around the opening, a pair of inwardly projecting wings integral with the door frame and having toothed inner edges, a door hingedly depending from the frame, inwardly extending upwardly curved barbed fingers integral with the door, and means preventing outward swinging movement of the door.

2. A rat trap comprising a rectangular casing, having an opening at one end thereof, a door frame around the opening, a pair of inwardly projecting wings integral with the door frame and having toothed inner edges, a pair of bearing brackets integral with the door frame, a shaft mounted in the brackets, a door hinged to and depending from the shaft, a bowed floor plate in the casing, and means preventing outward swinging movement of the door.

3. A rat trap comprising a rectangular casing, having an opening at one end thereof, a door frame around the opening, a pair of inwardly projecting wings integral with the door frame and having toothed inner edges, a door hinged at its upper edge to the door frame, the lower edge of said door slitted to form fingers, said fingers curving inwardly and upwardly, and sharpened to form barbs, a bowed floor plate in the casing, said door frame engaging the door and preventing outward swinging movement thereof.

THEODORE VANDERBILT CLAPP.